United States Patent
Kirsopp et al.

(10) Patent No.: US 9,416,970 B2
(45) Date of Patent: Aug. 16, 2016

(54) COMBUSTOR HEAT PANEL ARRANGEMENT HAVING HOLES OFFSET FROM SEAMS OF A RADIALLY OPPOSING HEAT PANEL

(75) Inventors: Philip J. Kirsopp, Lebanon, CT (US); Aaron J. Dornback, Wethersfield, CT (US); James B. Hoke, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1729 days.

(21) Appl. No.: 12/627,528

(22) Filed: Nov. 30, 2009

(65) Prior Publication Data

US 2011/0126543 A1    Jun. 2, 2011

(51) Int. Cl.
  *F02C 1/00* (2006.01)
  *F23R 3/00* (2006.01)

(52) U.S. Cl.
  CPC ....... *F23R 3/002* (2013.01); *F23R 2900/03041* (2013.01); *Y02T 50/675* (2013.01)

(58) Field of Classification Search
  USPC ........... 60/752, 753, 754, 755, 756, 757, 758, 60/759, 760, 796, 804
  See application file for complete search history.

(56) References Cited

U.S. PATENT DOCUMENTS

| 2,348,754 | A | * | 5/1944 | Ray | .............. | 138/149 |
| 3,031,844 | A | * | 5/1962 | Tomolonius | .............. | 60/752 |
| 4,695,247 | A | | 9/1987 | Enzaki et al. | | |
| 4,864,827 | A | | 9/1989 | Richardson et al. | | |
| 5,435,139 | A | | 7/1995 | Pidcock et al. | | |
| 5,758,503 | A | | 6/1998 | DuBell et al. | | |
| 5,782,294 | A | | 7/1998 | Froemming et al. | | |
| 6,070,412 | A | | 6/2000 | Ansart et al. | | |
| 6,237,344 | B1 | | 5/2001 | Lee | | |
| 6,408,628 | B1 | | 6/2002 | Pidcock et al. | | |
| 6,408,629 | B1 | | 6/2002 | Harris et al. | | |
| 6,606,861 | B2 | * | 8/2003 | Snyder | ............ | 60/752 |
| 6,675,587 | B2 | * | 1/2004 | Graves et al. | ........... | 60/804 |
| 6,810,673 | B2 | | 11/2004 | Snyder | | |
| 7,093,439 | B2 | | 8/2006 | Pacheco-Tougas et al. | | |
| 7,093,441 | B2 | | 8/2006 | Burd et al. | | |
| 2002/0017101 | A1 | * | 2/2002 | Schilling et al. | ............ | 60/747 |

(Continued)

OTHER PUBLICATIONS

Lefebvre, Arthur H., Gas Turbine Combustion—Second Edition, p. 111-115, Ann Arbor, MI: Edwards Brothers, 1998.*

*Primary Examiner* — Gerald L Sung
(74) *Attorney, Agent, or Firm* — Cantor Colburn LLP

(57) ABSTRACT

A combustor module for a gas turbine engine is provided that includes a first annular liner assembly extending along a longitudinal axis of the engine. The first annular liner assembly includes a first annular support shell and a plurality of first heat shield panels coupled to the first annular support shell. The first heat shield panels form a segmented ring defining a plurality of first axial seams therebetween. The combustor module further includes a bulkhead coupled to the first annular liner assembly. The bulkhead provides a plurality of fuel nozzles for passing a first mass flow comprising fuel and air. The combustor module further includes a second annular liner assembly coupled to the bulkhead. The second annular liner assembly is in spaced-apart generally coaxial relationship from the first annular liner assembly by a channel height H. The second annular liner assembly includes an air admittance hole having a mean diameter D extending along a hole axis. The hole axis is offset from the first axial seam defined by the first heat shield panels.

21 Claims, 5 Drawing Sheets

(56) References Cited

U.S. PATENT DOCUMENTS

| | | |
|---|---|---|
| 2003/0213250 A1* | 11/2003 | Pacheco-Tougas et al. .... 60/752 |
| 2005/0086940 A1* | 4/2005 | Coughlan et al. .............. 60/752 |
| 2007/0180809 A1* | 8/2007 | Bessagnet et al. ........... 60/39.01 |
| 2008/0230997 A1* | 9/2008 | Boston et al. ................. 277/355 |
| 2009/0139239 A1* | 6/2009 | Zupanc et al. ................. 60/740 |

* cited by examiner

US 9,416,970 B2

COMBUSTOR HEAT PANEL ARRANGEMENT HAVING HOLES OFFSET FROM SEAMS OF A RADIALLY OPPOSING HEAT PANEL

STATEMENT OF GOVERNMENT INTEREST

The United States Government has certain rights in this disclosure pursuant to contract number N00019-02-C-3003 between the United States Navy and United Technologies Corporation.

FIELD OF THE DISCLOSURE

This disclosure relates generally to combustors for gas turbine engines and, more particularly, to a heat shield panel arrangement for use in double wall gas turbine combustors.

BACKGROUND OF THE DISCLOSURE

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. In aircraft engine applications, the compressor, combustor and turbine are disposed about a central engine axis with the compressor disposed axially upstream of the combustor and the turbine disposed axially downstream of the combustor.

An exemplary twin wall combustor features an annular combustion chamber defined between a radially inward liner and radially outward shell extending aft from a forward bulkhead. The radially inward liner forms a heat shield. The radially outward shell extends circumferentially about and is radially spaced from the inward liner. Arrays of circumferentially distributed air admittance holes penetrate the outward shell and the inward liner at multiple axial locations along the length of the combustion chamber. Cooling air passes through the holes in the outer shell and then again through the holes in the inner liner, and finally into the combustion chamber. A plurality of circumferentially distributed fuel injectors and associated air passages are mounted in the forward bulkhead. The fuel injectors project into the forward end of the combustion chamber to supply the fuel. The associated air passages impart a swirl to inlet air entering the forward end of the combustion chamber at the bulkhead to provide rapid mixing of the fuel and inlet air. Commonly assigned U.S. Pat. Nos. 6,606,861; 6,810,673 and 7,094,441; the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. A combustor configured for RQL combustion includes three serially arranged combustion zones: a fuel-rich combustion zone at the forward end of the combustor, a quench or dilution zone that involves the conversion of rich combustion to lean combustion, and a lean combustion zone axially aft of the quench or dilution zone. Thus, the combustion process in a combustor configured for RQL combustion has two governing states of combustion: a first state in the forward portion of the combustor that is stoichiometrically fuel-rich and a second state in a downstream portion of the combustor that is stoichiometrically fuel-lean.

During engine operation with RQL combustion, a portion of the pressurized air discharged from the compressor is directed through a diffuser to enter the combustion chamber through the inlet air swirlers to support rich-burn combustion. Concurrently, the fuel injectors introduce a stoichiometrically excessive quantity of fuel into the front portion of the combustor. The resulting stoichiometrically rich fuel-air mixture is ignited and burned to partially release the energy content of the fuel. The fuel rich character of the mixture inhibits NOx formation in the rich burn zone by suppressing the combustion flame temperature. It also resists blowout of the combustion flame during certain operating conditions or any abrupt transients to engine power and promotes good ignition of the combustor.

The fuel rich combustion products generated in the first zone of combustion propagate downstream where the combustion process continues. Pressurized air from the compressor enters the combustion chamber radially through a row of circumferentially spaced dilution air admission holes. The additional air admitted through these dilution air holes mixes with the combustion products from the first zone to support further combustion and release additional energy from the fuel. The air also progressively deriches the fuel rich combustion gases as these gases flow axially through and mix with the air introduced in the quench region. Initially, with the dilution air addition, the fuel-air ratio of the combustion products becomes less fuel rich approaching a stoichiometric composition, causing an attendant rise in the combustion flame temperature. Since the quantity of NOx produced in a given time interval increases exponentially with flame temperature, significant quantities of NOx can be produced during the initial quench process where the combustion is rich. As quenching continues, the fuel-air ratio of the combustion products rapidly convert through the stoichiometric state to become fuel lean, causing an attendant reduction in the flame temperature. However, until the mixture is diluted to a fuel-air ratio substantially lower than stoichiometric, the flame temperature remains high enough to generate appreciable quantities of NOx.

One advantage of a twin wall arrangement is that an assembled twin wall arrangement is structurally stronger. A disadvantage to the twin wall arrangement, however, is that high-temperature zones of localized, near-stoichiometric combustion conditions, commonly called hot spots, can occur despite the fuel-rich nature of the forward portion and the fuel-lean nature of the aft portion of a RQL combustion chamber. Therefore, thermal maldistribution must be accounted for closely. Different zones of the combustor will experience different amounts of heat, resulting in local hot zones and the associated stress and strain. If the thermal combustor design does not account for maldistribution of thermal loads, then the usable life of the combustor may be negatively affected.

SUMMARY OF THE DISCLOSURE

The present disclosure provides a combustor module for a gas turbine engine including a first annular liner assembly extending along a longitudinal axis of the engine. The first annular liner assembly includes a first annular support shell and a plurality of first heat shield panels coupled to the first annular support shell. The first heat shield panels form a segmented ring defining a plurality of first axial seams therebetween. The combustor module further includes a bulkhead coupled to the first annular liner assembly. The bulkhead provides a plurality of fuel nozzles for passing a first mass flow comprising fuel and air. The combustor module further includes a second annular liner assembly coupled to the bulkhead. The second annular liner assembly is in spaced-apart generally coaxial relationship from the first annular liner assembly by a channel height H. The second annular liner assembly includes an air admittance hole having a mean diameter D extending along a hole axis. The hole axis is offset from the first axial seam defined by the first heat shield panels.

In one aspect of the disclosure, the mean diameter D, a gas flow g through the combustor, a jet flow j through the air admittance hole, and a momentum flux ratio J of the combustor flow and the jet flow are sufficient to provide a jet penetration distance Y along the hole axis, wherein Y is greater than or equal to H.

In one aspect of the disclosure, the jet penetration distance Y is defined by the equation $Y=D_j[g/(g+j)]\sqrt{J}$.

In another aspect of the disclosure, a method for mitigating effects of maldistributed thermal loads in a combustor module is provided. The method includes the steps of selecting a first annular liner assembly. The first annular liner assembly includes a first annular support shell and a plurality of first heat shield panels coupled to the first annular support shell. The first heat shield panels form a segmented ring defining a plurality of first axial seams therebetween. The method further includes the step of coupling a bulkhead to the first annular liner assembly, and coupling a second annular liner assembly to the bulkhead. The second annular liner assembly is arranged in spaced-apart generally coaxial relationship from the first annular liner assembly by a channel height H. The method further includes the step of selecting an arrangement of air admittance holes penetrating through the second annular liner assembly, wherein the air admittance holes have a mean diameter D and extend along a hole axis. The method further includes the step of offsetting the air admittance holes in the second annular liner assembly from the first axial seam defined by the first heat shield panels.

In one aspect of the disclosure, the step of selecting an arrangement of air admittance holes includes establishing fully penetrating flow through the air admittance holes.

In one aspect of the disclosure, the step of establishing fully penetrating flow comprises determining a jet penetration distance Y along the hole axis.

In one aspect of the disclosure, the jet penetration distance Y is determined empirically by correlating the mean diameter D, a gas flow g through the combustor, a jet flow j through the air admittance hole, and a momentum flux ratio J of the combustor flow and the jet flow.

In one aspect of the disclosure, the empirical determination of the jet penetration distance Y is defined by the equation $Y=D_j[g/(g+j)]\sqrt{J}$.

BRIEF DESCRIPTION OF THE DRAWINGS

The novel features that are characteristic of the preferred embodiment of the disclosure are set forth with particularity in the claims. The disclosure itself may be best be understood, with respect to its organization and method of operation, with reference to the following description taken in connection with the accompanying drawings in which:

DETAILED DESCRIPTION OF THE PREFERRED EMBODIMENT

Figure 1:
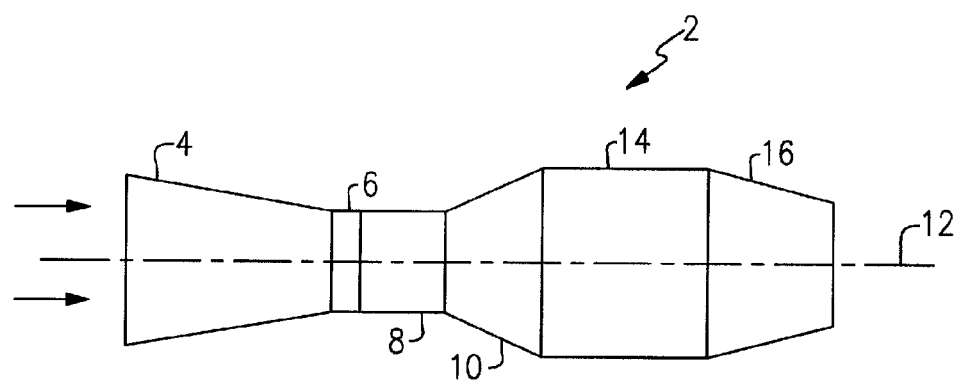
FIG. 1 is a schematic view of a gas turbine engine according to one embodiment of the present disclosure.

Referring to FIG. 1 of the drawings, a conventional gas turbine engine 2 generally includes a compressor module 4, a diffuser section 6, a combustor module 8, and a turbine module 10. The modules are disposed about a central longitudinal axis 12 which constitutes the centerline of the gas turbine engine. Gas flow through the gas turbine engine 2 is indicated by arrow F. Some gas turbine engines, such as those used in military applications, include an afterburner section 14 and a nozzle 16. On the other hand, some gas turbine engines such as those used large commercial jet liners of contemporary design include a high bypass ratio fan module (not shown) forward of the compressor module 4. It should be noted that small engines may have radial or centrifugal compressors, rather than axial compressors.

Figure 3:
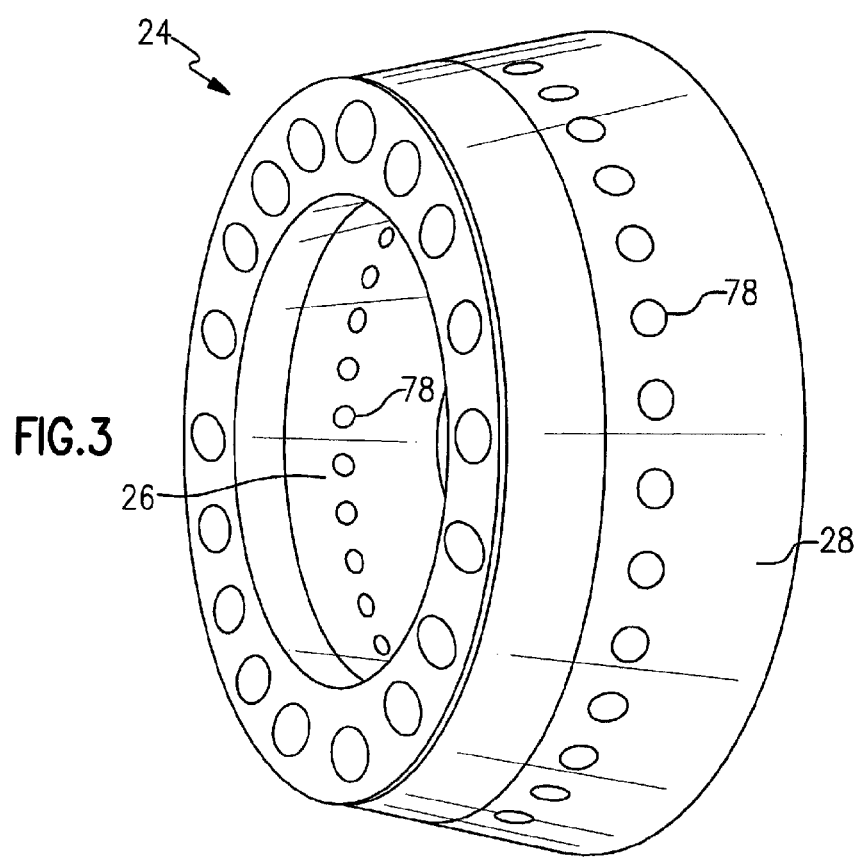
FIG. 3 is a perspective view of the combustor of FIG. 1.
Figure 2:
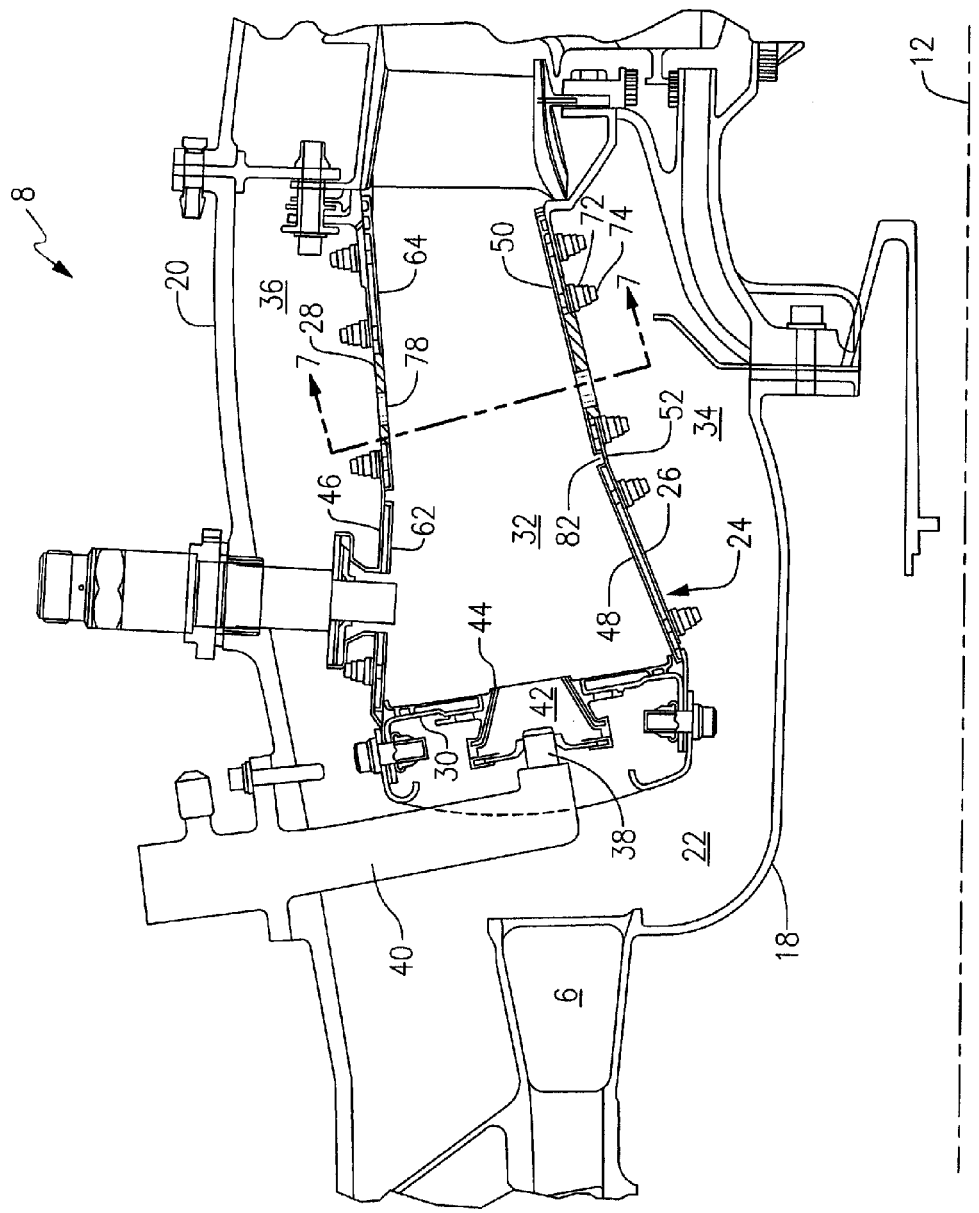
FIG. 2 is a schematic diagram of the combustor module of FIG. 1.

Referring now to FIGS. 2 and 3, the exemplary combustor module 8 includes a radially inner case 18 and a radially outer case 20 concentric with and circumscribing the inner case, which in cooperation define an annular pressure vessel 22 concentric with the engine axis 12. An annular combustor 24 is disposed within the annular pressure vessel 22. The combustor 24 has a liner assembly that includes a radially inner liner assembly 26 circumscribing an axially extending engine axis 12, a radially outer liner assembly 28 that circumscribes the inner liner assembly 26 in generally coaxial spaced relationship therewith, and a bulkhead 30 extending between the respective forward ends of the inner liner assembly 26 and the outer liner assembly 28. Collectively, the inner liner assembly 26, the outer liner assembly 28, and the forward bulkhead 30 bound an annular combustion chamber 32. The inner liner assembly 26 cooperates with the inner case 18 to define an inner air plenum 34, and the outer liner assembly 28 cooperates with the outer case 20 to define an outer air plenum 36.

The combustor 24 may have a forward section wherein the inner and outer liners converge from fore to aft and an aft section wherein the inner and outer liner converge fore to aft more gradually than the forward section. A detailed description of a combustor of this configuration is presented in the aforementioned U.S. Pat. No. 7,093,441. However, the depicted combustor configuration is exemplary and not limiting of the disclosure. For example, the combustor 24 may have a forward section wherein the inner and outer liners extend aft in parallel relationship and an aft section wherein the inner and outer liner converge fore to aft. A detailed description of a combustor of this configuration is presented in the aforementioned U.S. Pat. Nos. 6,606,861 and 6,810,673. In other configurations, the inner and outer liners may be parallel over the entire length of the liner assembly, or the liners may converge in a forward section and then extend parallel in an aft section, or the liners may converge in both the forward and aft sections at the same or different angles of convergence throughout, or the liners may assume geometrically differing profiles in cross-section.

The forward bulkhead 30 carries a plurality of fuel nozzles 38, for example typically from twelve (12) to twenty-four (24) depending upon the size of the engine, disposed in a circumferential array at spaced intervals about the annular combustion chamber 32. Each fuel nozzle 38 is disposed at the end of a support 40 which extends through the outer case 20 to convey fuel from an external source to the associated fuel nozzle. Each of the fuel nozzles 38 injects fuel through a spray head into a central stream of air emitted along the centerline of the fuel nozzle. An air passage 42 which may have a swirler 44 associated therewith as depicted in the exemplary embodiment, is operatively associated with each of the fuel nozzles 38. Pressurized air from the compressor module 4 is directed through the diffuser section 6 into the inner air plenum 34 and the outer air plenum 36 defined within the annular pressure vessel 22. A portion of this pressured air passes into the combustion chamber 32 through the air passage 42. Each swirler 44 imparts a spin to the air passing therethrough to provide rapid mixing of this air with the fuel being injected through each of the associated fuel nozzles 38.

Referring to FIGS. 2 and 3, in the exemplary embodiment the inner liner assembly 26 and the outer liner assembly 28 are structured with a support shell and associated heat shield panels. The outer liner assembly 28 may comprise a single-piece outer support shell 46 fastened to the outer case 20, and the heat shields may be formed as a circumferential array of arcuate heat shield panels. Other embodiments may exclude the heat shield panels in one of the liner assemblies. For example, an alternate construction may comprise a single-wall outer liner and an inner liner assembly comprising a support shell and heat shield panels.

Figure 4:
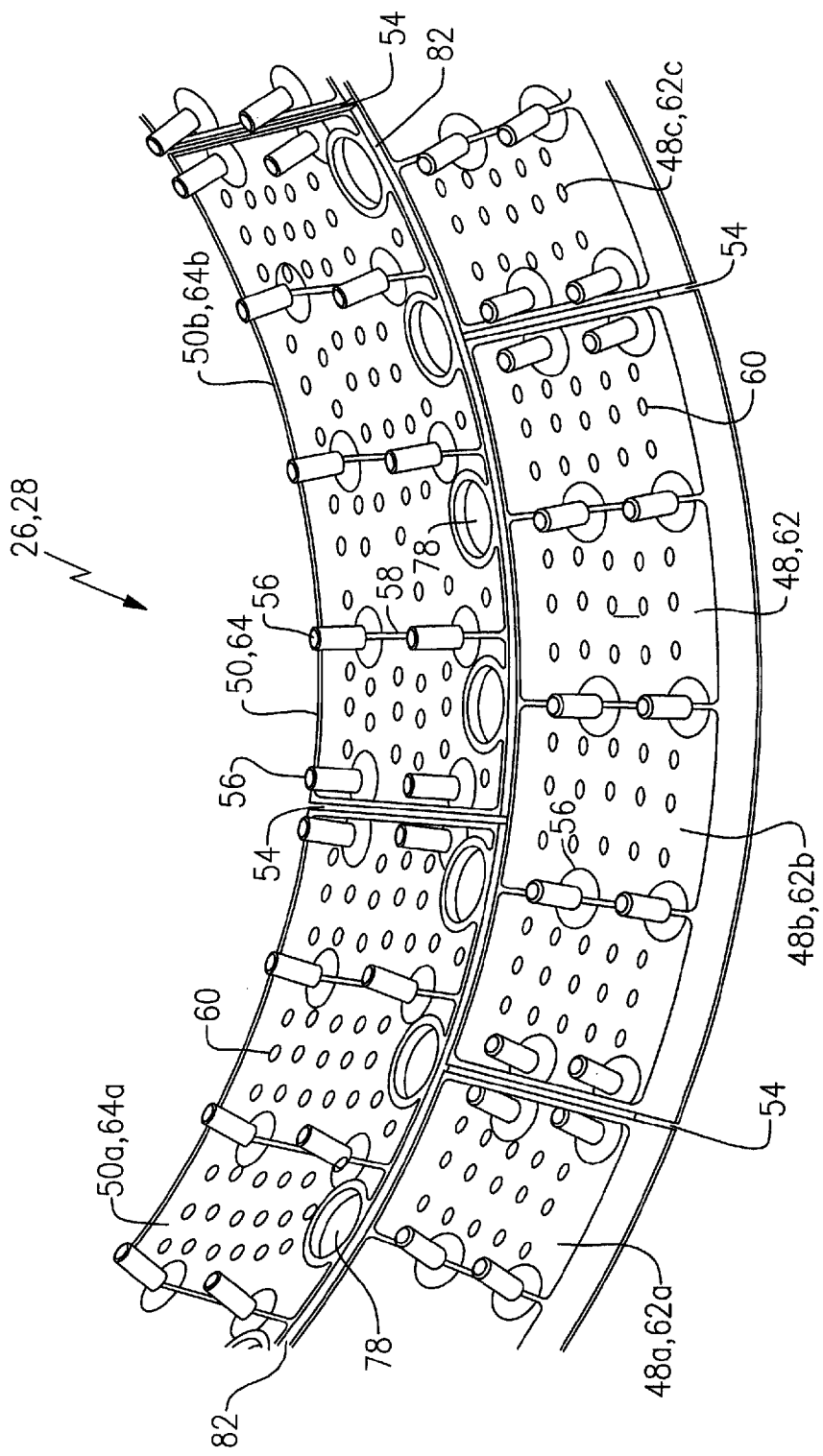
FIG. 4 is a schematic representation of the alignment of the forward heat shield panels with the aft heat shield panels.

Referring to FIGS. 2 and 4, shown is an exemplary embodiment of the heat shield panel arrangement for the inner liner assembly 26. An array of forward inner heat shield panels 48 and an array of aft inner heat shield panels 50 line the hot side of an inner support shell 52. Referring to FIG. 4, wherein the inner support shell 52 is removed for clarity, the forward and aft inner heat shield panels 48, 50 form a segmented ring defining a plurality of axial seams 54 therebetween. The forward inner heat shield panels 48a, 48b, and 48c include a plurality of mounting posts 56 through which studs pass. The exemplary aft inner heat shield panels 50a, 50b similarly include mounting posts 56. The aft inner heat shield panel 50 further includes a plurality of rails 58. The rails 58 serve to create pockets for supplying cooling air when the heat shield panel is mated to the support shell. The pockets meter cooling air through a plurality of film cooling holes 60 in the heat shield panel to provide film cooling to the hot surfaces of the heat shield panels. The film cooling holes 60 are typically about 0.025 inches (0.64 mm) in diameter.

Still referring to FIG. 4, the heat shield panel arrangement for the outer liner assembly 28 may have a similar construction. An array of forward outer heat shield panels 62 and an array of aft outer heat shield panels 64 line the hot side of the outer support shell 46. The outer support shell 46 is removed for clarity.

Figure 5:
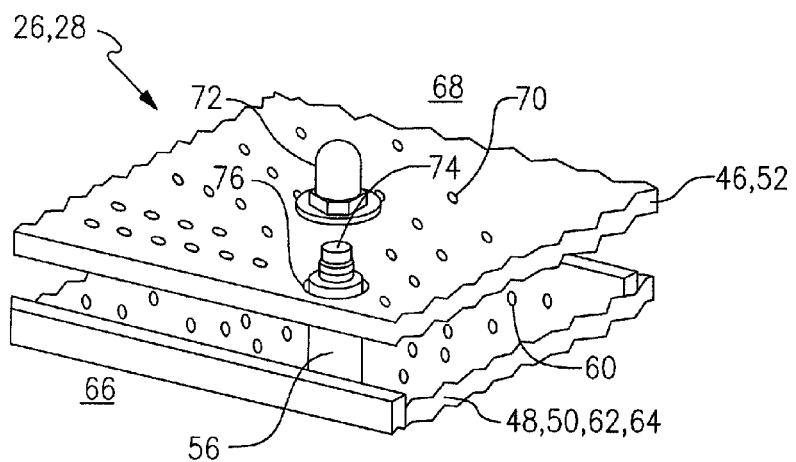
FIG. 5 is an elevation view, partly in section, of a sector of the liner assembly of FIG. 2.

Referring to FIG. 5, shown is an exemplary heat shield panel 48, 50, 62, 64 mated to a corresponding support shell 46, 52 defining a hot side 66 and a cold side 68 of the liner assembly 26, 28. As shown in FIGS. 2, 4, and 5, impingement cooling holes 70 penetrate through the support shell 46, 52 from the inner and outer air plenum 34, 36 respectively, to allow cooling air to enter the space between the inner and outer support shells and the respective heat shield panels. The plurality of film cooling holes 60 penetrate each of the heat shield panels 48, 50, 62, and 64, to allow cooling air to pass from the cold side 68 of the panel to the hot side 66 of the panel and to promote the creation of a film of cooling air over the hot side of each panel. A plurality of nuts 72 and studs 74 may be used to fasten each of the heat shield panels to the respective support shell 46, 52.

In one embodiment, the heat shield panels are thermally de-coupled from the support shells to which they are fastened. That is, during operation the panels thermally expand and contract without imposing mechanical stress on the support shells. The exemplary support shell 46, 52 may include clearance holes 76 through which the mounting posts 56 pass. The clearance holes 76 are sized with sufficient clearance so as to allow the heat shield panel to thermally expand without creating an interference. One of the clearance holes 76 in each panel is sized to provide a line-on-line fit with a corresponding pin at assembly. In this manner, the respective heat shield panel is fixed at a single point only to the support shell and is permitted to thermally expand about the single point.

Referring now back to FIG. 4, the inner and outer liner assembly 26, 28 further include a plurality of circumferentially spaced air admittance holes 78, also referred to as a quench holes. Combustion air flowed through the air admittance holes 78 serves not only as secondary air to provide additional oxygen for completion of combustion on the partially-combusted combustion product gases, but also as quench mixing air to cool the main flow of partially-combusted combustion product gases for reducing high temperature regions, that is hot spots, within the combustion product gases for the dual purposes of controlling the formation of oxides of nitrogen and of providing a more uniform temperature profile in the combustion product gases exiting the combustor to pass through the turbine of the gas turbine engine.

Figure 6A:
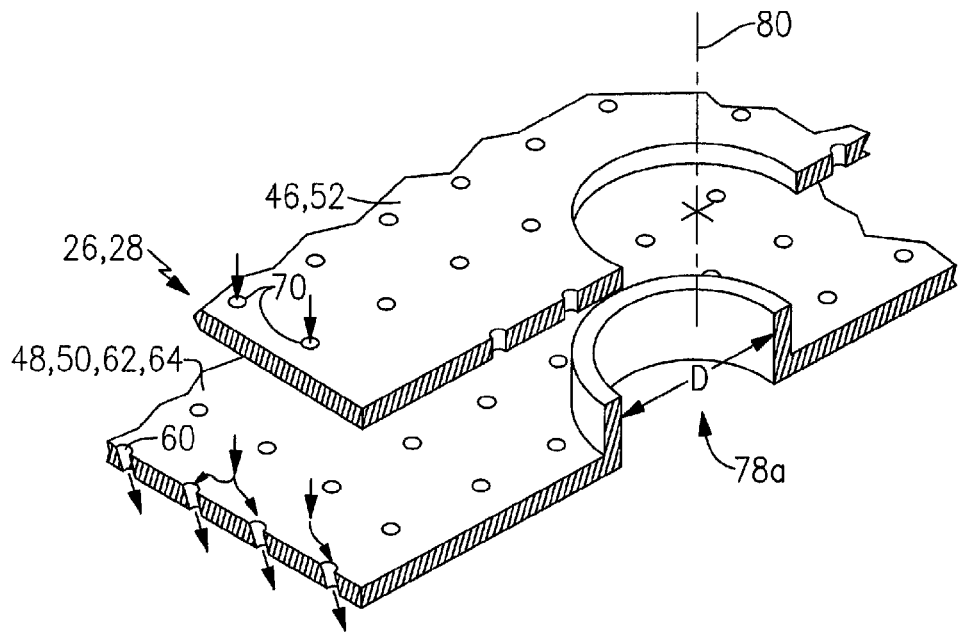
FIGS. 6A and 6B are additional elevation views, partly in section, of a sector of the liner assembly of FIG. 2.

Referring to FIG. 6A, the air admittance hole 78 has a diameter D. In some examples, the air admittance hole 78 may be elliptical or oval in shape, in which case D is taken as the mean diameter. In one example wherein the combustor 24 is arranged in a gas turbine engine for a commercial airliner, the diameter D is greater than 0.4 inches (1.27 cm). The hole 78 extends along a hole axis 80, which is generally in a radial direction. However, in some examples the hole axis 80 may be offset from the radial axis by about 10 degrees. In other examples, the hole axis 80 may be offset from the radial axis up to about 30 degrees.

Figure 6B:
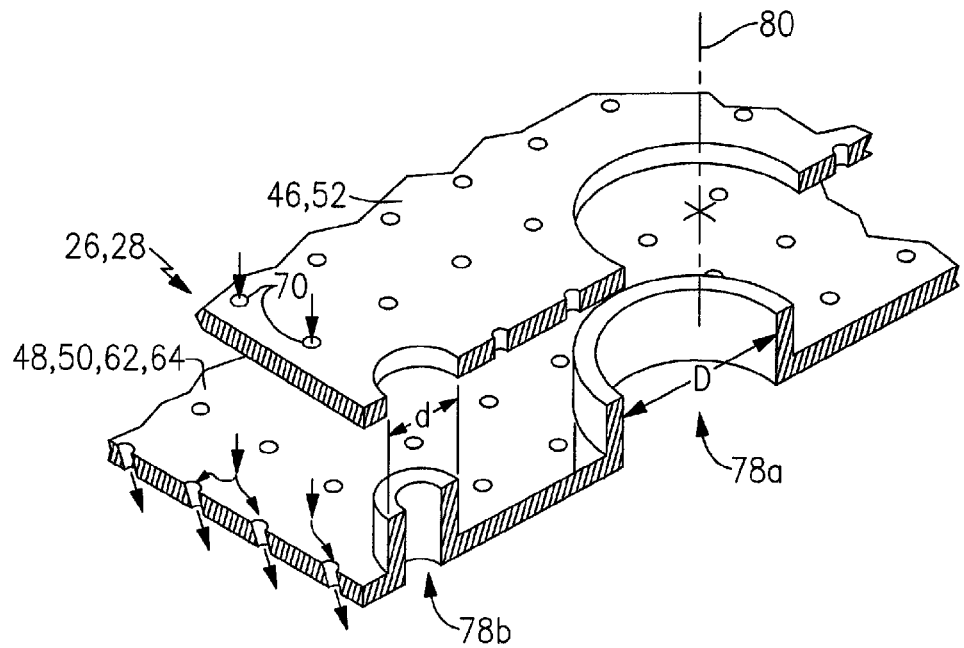

The circumferential pattern of air admittance holes 78 may also include a pattern of secondary, smaller diameter holes. Referring to FIG. 6B, in the exemplary embodiment of the depicted combustor 24, the liner assembly 26, 28 has a plurality of large diameter air admittance holes 78a having a diameter D, and a plurality of smaller diameter air admittance holes 78b having a diameter d. The plurality of second air admittance holes 78b are shown arranged in between the large diameter air admittance holes 78a. However, depending upon the particular design of the combustor 24, alternate arrangements are possible. In the example given above, the diameter d is typically less than 0.375 inches (0.95 cm).

In the depicted embodiment shown in FIGS. 6A and 6B, the plurality of air admittance holes 78 are arranged on the aft heat shield panels 50, 64. However, depending upon the particular design of the combustor 24, the air admittance holes 78 may also be arranged on the forward heat shield panels 48, 62.

Figure 7:
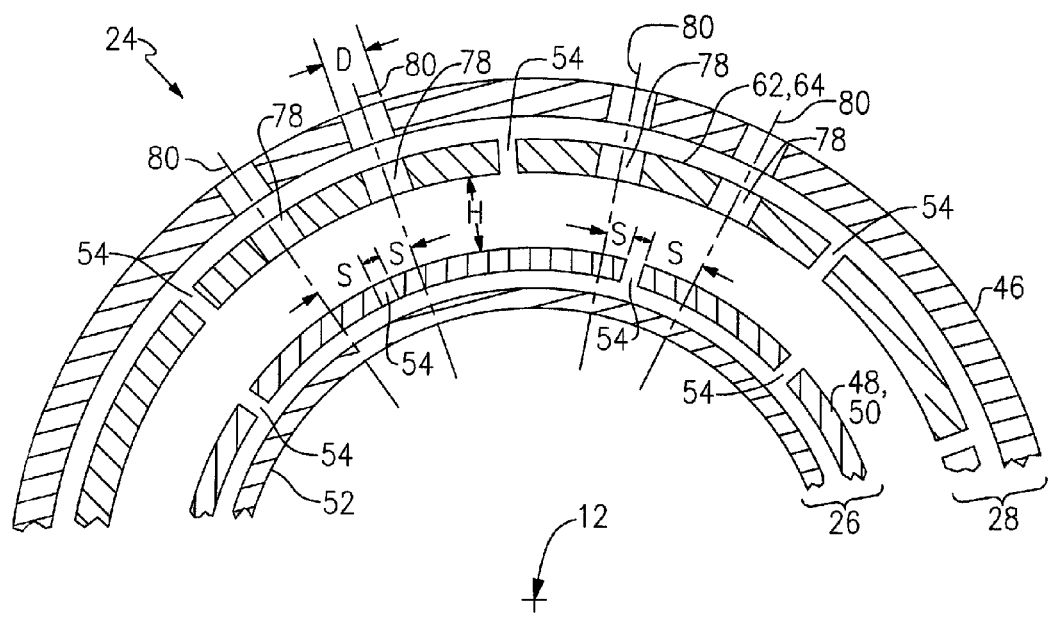
FIG. 7 is a cross-sectional view of the combustor of FIG. 2.

Referring to FIG. 7, a cross-sectional view of the combustor 24 is shown as viewed down the longitudinal engine axis 12. For illustrative purposes, only two air admittance holes 78 per panel are shown, but any number may be appropriate depending upon the particular aspects of the design. In the embodiment shown, the inner liner assembly 26 includes the inner support shell 52 and the plurality of inner heat shield panels 48, 50. Further, the outer liner assembly 28 includes the outer support shell 46 and the plurality of outer heat shield panels 62, 64. As shown, the heat shield panels form a segmented ring defining a plurality of the axial seams 54. The axial seams 54 are typically 0.040-0.100 inches wide (1.02-2.54 mm) in the cold assembled state, and close down to approximately 0.020-0.060 inches (0.51-1.52 mm) during gas turbine engine operation. The air admittance holes 78 are illustrated as passing through the outer liner assembly 28 however, as explained hereinabove, may also or exclusively pass through the inner liner assembly 26. The air admittance holes 78 have a mean diameter D along the hole axis 80.

The air admittance holes 78 through the outer liner assembly 28 are circumferentially offset from the axial seams 54 in the opposing inner heat shield panels 48, 50 by a distance S, as shown. When quench air flows through the air admittance holes 78, the velocity and/or mass flow of the quench air sets up a radially-directed jet flow pattern and forces some of the hot combustion gases flowing axially through the combustion chamber 32 toward the heat shield panels on the opposing liner assembly. If the hot combustion gases impinge upon an axial seam 54, a "hot spot" forms because there is insufficient cooling flow through the film cooling holes 60 at the seams. In some examples, there are no film cooling holes 60 at the seams. The hot spots are particularly detrimental because they can cause cracking and oxidation of the underlying support shell, which is not intended to be a replaceable component. The offset S prevents the hot combustion gases from impinging on the axial seams 54. The degree of offset S is dependent upon the particular configuration and flow characteristics, but generally is sufficient to assure the outer diameter D of the air admittance hole 78 is aligned with the pattern of film cooling holes 60 on the opposing heat shield panel.

The region of the combustion chamber 32 into which the quench air is introduced through the air admittance holes 78 is referred to as the quench zone. The partially-combusted combustion product gases passing from the fuel-rich burn zone include unburned fuel which, after traversing the quench zone, is completely combusted in a fuel lean burn zone downstream of the quench zone. The quench air may set up radially directed air jet patterns, or jet flow j, that may impact the heat shield panels on the opposing liner assembly. Such a jet flow is termed "fully penetrating." On the one hand, fully penetrating jet flow is desirable because maximum mixing is achieved in the quench zone. On the other hand, fully penetrating jet flow may cause thermal problems on the opposing liner. A jet penetration distance Y may be empirically or experimentally determined to judge whether, given the combustion flow g and the jet flow j, fully penetrating jet flow is achieved.

In one example, the jet penetration distance Y is determined empirically. A momentum flux ratio J may first be determined according to the equation:

$$J = \rho_j U_j^2 / \rho_g U_g^2,$$

where $\rho_j$ and $\rho_g$ are the densities of the air flow jet and combustion gas respectively, and $U_j$ and $U_g$ are the respective velocities of the air flow jet and combustion gas. Then, the jet penetration distance Y may be determined according to the equation:

$$Y = D_j [g/(g+j)] \sqrt{J},$$

where $D_j$ is the mean diameter of the air admittance hole 78, g is the mass flow of the partially-combusted combustion product gases, and j is the mass flow of the quench air through the air admittance hole 78. The offset S between the axis 80 of the air admittance hole 78 and the axial seam 54 in the opposing heat shield panel may be applied when the value of the jet penetration distance Y is greater than or equal to the channel height H.

In another example, the empirical determination of the jet penetration distance Y may be determined using computational fluid dynamics (CFD) models. A commercially available software package such as Fluent may be used.

In general, air admittance holes 78 having the smaller diameter d are not fully penetrating, that is, they do not develop a sufficient jet penetration distance Y to reach the opposite heat shield panel (across channel height H). In other words, for smaller diameter air admittance holes 78, H is greater than Y. Similarly, some combustor configurations having larger diameter air admittance holes 78 do not develop sufficient jet penetration distance Y to reach the opposite heat shield panel because the combustor flow g is high, and the jet flow j tends to be pushed axially downstream before reaching the opposing heat shield panel.

Further, axial seams 54 in the forward heat shield panels 48, 62 may not be affected by the jet flow j because the main combustion flow g forces the jet flow j axially downstream to the region of the aft heat shield panels 50, 64. Therefore, in some configurations the offset S is only applied in relation to the aft heat shield panels 50, 64.

Referring back to FIG. 4, liner assemblies 26, 28 that include forward heat shield panels 48, 62 and aft heat shield panels 50, 64 define a circumferential seam 82 between the forward and aft segmented rings. The circumferential seams 82 are typically 0.040-0.080 inches wide (1.02-2.03 mm) in the cold assembled state, and close down to approximately 0.020 inches or less (0.51 mm) during gas turbine engine operation.

While the present disclosure has been described with reference to a particular preferred embodiment and the accompanying drawings, it will be understood by those skilled in the art that the disclosure is not limited to the preferred embodiment and that various modifications and the like could be made thereto without departing from the scope of the disclosure as defined in the following claims.

We claim:

1. A combustor module for a gas turbine engine, comprising:
    a first annular liner assembly extending along a longitudinal axis, the first annular liner assembly comprising a first annular support shell and a plurality of first heat shield panels coupled to the first annular support shell, the first heat shield panels forming a segmented ring defining a plurality of first axial seams therebetween;
    a bulkhead coupled to the first annular liner assembly, the bulkhead providing a plurality of fuel nozzles for passing a first mass flow comprising fuel and air;
    a second annular liner assembly coupled to the bulkhead, the second annular liner assembly in spaced-apart generally coaxial relationship from the first annular liner assembly by a channel height H, the second annular liner assembly comprising a plurality of air admittance holes each having a mean diameter D, each air admittance hole extending along a hole axis, and each hole axis being offset from one of the first axial seams by an equal distance S.

2. The combustor module of claim 1 wherein the mean diameter D of the air admittance hole is greater than about 1.27 centimeters.

3. The combustor module of claim 1 wherein the mean diameter D, a gas flow g through the combustor, a jet flow j through the air admittance hole, and a momentum flux ratio J of the combustor flow and the jet flow are sufficient to provide a jet penetration distance Y along the hole axis, wherein Y is greater than or equal to H.

4. The combustor module of claim 3, wherein the jet penetration distance Y is defined by the equation $Y=D_j[g/(g+j)]\sqrt{J}$.

5. The combustor module of claim 1 wherein the first annular support shell is an inner support shell.

6. The combustor module of claim 1 wherein the first heat shield panels forming a segmented ring further comprise a forward heat shield panel and an aft heat shield panel defining a circumferential seam therebetween.

7. The combustor module of claim 1 wherein the second annular liner assembly comprises a second annular support shell and a plurality of second heat shield panels coupled to the second annular support shell, the second heat shield panels forming a segmented ring having second axial seams therebetween.

8. The combustor module of claim 7, wherein the second heat shield panels further comprise forward heat shield panels and aft heat shield panels defining a circumferential seam therebetween.

9. The combustor module of claim 1, wherein the first heat shield panels are thermally decoupled from the first annular support shell.

10. The combustor module of claim 1, wherein the offset between the first axial seam and the axis of the air admittance hole is sufficient to assure the outer diameter of the air admittance hole is aligned with a pattern of film cooling holes on the first heat shield panel.

11. A method for mitigating effects of maldistributed thermal loads in a combustor module, the method comprising the steps of:
    selecting a first annular liner assembly comprising a first annular support shell and a plurality of first heat shield panels coupled to the first annular support shell, the first heat shield panels forming a segmented ring defining a plurality of first axial seams therebetween;
    coupling a bulkhead to the first annular liner assembly;
    coupling a second annular liner assembly to the bulkhead, the second annular liner assembly in spaced-apart generally coaxial relationship from the first annular liner assembly by a channel height H;
    selecting an arrangement of air admittance holes penetrating through the second annular liner assembly, the air admittance holes having a mean diameter D and extending along a hole axis; and
    offsetting each hole axis of the air admittance holes in the second annular liner assembly from one of the first axial seams by an equal distance S.

12. The method of claim 11, wherein the step of selecting an arrangement of air admittance holes comprises establishing fully penetrating flow through the air admittance holes.

13. The method according to claim 12, wherein the step of establishing fully penetrating flow comprises determining a jet penetration distance Y along the hole axis.

14. The method according to claim 13, wherein the jet penetration distance Y is determined using a computational fluid dynamics model.

15. The method according to claim 13 wherein the jet penetration distance Y is determined using a computational fluid dynamics model.

16. The method according to claim 15, wherein the empirical determination of the jet penetration distance Y correlates the mean diameter D, a gas flow g through the combustor, a jet flow j through the air admittance hole, and a momentum flux ratio J of the combustor flow and the jet flow.

17. The method according to claim 16, wherein the empirical determination of the jet penetration distance Y is defined by the equation $Y=D_j[g/(g+j)]\sqrt{J}$.

18. The method according to claim 11, wherein the step of offsetting the air admittance holes from the first axial seam comprises selecting the offset such that the outer diameter of the air admittance hole is aligned with a pattern of film cooling holes on the first heat shield panel.

19. The method according to claim 11, wherein the step of selecting a plurality of first heat shield panels comprises selecting a forward heat shield panel and an aft heat shield panel.

20. The method according to claim 11, wherein the second annular liner assembly comprises a second annular support shell and a plurality of second heat shield panels coupled to the second annular support shell, the second heat shield panels forming a segmented ring having second axial seams therebetween, the method further comprising the step of selecting an arrangement of air admittance holes penetrating through the first annular liner assembly.

21. The method according to claim 20, further including the step of offsetting the air admittance holes penetrating through the first annular liner assembly from the second axial seam defined by the second heat shield panels.

* * * * *